Patented Oct. 3, 1939

2,174,541

UNITED STATES PATENT OFFICE 2,174,541

SOLID SOLUTION OF ACETATES OF SUGARS

Victor Walthausen, Bronxville, and Lylla R. Metry, Brooklyn, N. Y.

No Drawing. Application March 9, 1936, Serial No. 67,906

5 Claims. (Cl. 134—23.4)

The present invention relates to solid solutions of sucrose octa-acetate and dextrose penta-acetate.

It is well known that numerous proposals for the production of sugar acetates, propionates, butyrates, etc. such as sucrose octa-acetate, dextrose penta-acetate, fructose penta-acetate, propionate, butyrate, and other esters etc. have been made in the literature. Nevertheless, the information to be gained from these sources is meager and usually limited to a simple statement of the reaction. Thus, for example, von Richter in his Organic Chemistry, vol. 1, page 545, states, "the acetyl esters are best obtained by heating them (the sugars) with acetic anhydride and sodium acetate or ferrous chloride". Similar treatment is given in Beilstein's "Treatise on Organic Chemistry" and Bernthsen's "Text-book of Organic Chemistry". Hale and Hudson discuss the preparation of the sugar acetates in connection with a study of their optical powers. (J. A. C. S. May 1915, pages 1264–1283). More recent references are to semi-commercial processes such as those described in Sucre Belge (1932), vol. 52, page 65, by V. Boulez, and the article by Cox, Ferguson and Dodds in the Journal of Industrial and Engineering Chemistry (1933), vol. 25, page 968. U. S. Patent 2,013,034 issued to Cox and Ferguson describes an improved method of acylating sugars in which the quantity of the catalyst used is reduced and the rate at which the reactants are added to each other is reduced. The temperature at which the reaction is carried out remaining the same as in the prior art, i. e. the boiling point of the acid anhydride used. The advantage according to the inventors is that the reaction does not proceed with explosive violence. The art acylated sugars before Cox and Ferguson made their disclosure and could acylate artificial commercial invert sugar. The situation remained the same after the U. S. Patent 2,013,034 was issued. It has been the opinion of those skilled in the art that all sugars were amenable to the conditions taught by the literature. We have found that this is not true for commercial invert sugar.

The production of levulose from sucrose as a commercial product has been fraught with the difficulty of separation of the products entailing a tedious separation of the dextrose and levulose through the difficultly soluble calcium levulosate after the mineral acid has been removed from the solution by means of barium.

There have been attempts to use the octa acetate of sucrose as an adhesive either alone or in mixture with cellulose acetates. Sucrose acetate alone is a poor adhesive as is shown by the general knowledge that if two pieces of glass are "glued" together using sucrose octa acetate as the sole adhesive after a few days the pieces of glass may be pulled apart without the exertion of much force.

Although many attempts and proposals have been made, as far as we are aware, none has been wholly successful and satisfactory, especially when carried into practice on an industrial scale for the production of commercial products.

We have discovered that invert sugar can be satisfactorily and successfully acylated provided the content of water is reduced and an additional catalyst is used as well as the salt of the acid of which the anhydride is present during the reaction.

We have been able to overcome the drawback to the use of sucrose acetate as an adhesive by the use of mixtures of sucrose octa-acetate and dextrose penta-acetate and of mixtures of sucrose acetate and invert sugar acetates, especially in solid solutions in which the proportions of the acetates are controlled between certain critical limits.

Mixtures of the acetates of dextrose and sucrose are not as brittle, do not discolor as readily and are far more adhesive than sucrose octa-acetate. As an example of the increase of adhesiveness resulting from the addition of the proper amount of dextrose penta-acetate to sucrose octa-acetate the following experience is cited: If such a mixture is used in place of the sucrose acetate of the example given above to "glue" two pieces of glass together the pieces of glass cannot be pried apart for at least six months without breaking the glass.

These solid solutions of acetates of sucrose and dextrose can be used also as a plasticizer for paper, for grease and waterproofing paper and fabrics, for the manufacture of dielectrics in conjunction with cellulose derivatives, to impart special characteristics to varnishes and lacquers and as an adhesive with Cellophane, paper to metal, and glass to metal.

It is an object of this invention to provide a means for acylating invert sugar.

It is a further object of this invention to provide an adhesive compound composed of the acetates of invert sugar, or a mixture of invert sugar and sucrose acetates, or a mixture of dextrose and sucrose acetates.

It is another object of this invention to provide means whereby levulose may be obtained more easily than by the processes known to the art.

Other objects and advantages will become apparent to those skilled in the art from the following description.

Broadly stated, the invention contemplates carefully dehydrating the invert sugar to a critical degree prior to the acylating procedure. In this procedure, critical temperature limits and ranges are used as well as a salt of a metal of the second group of the periodic system, including beryllium, magnesium, zinc, cadmium and mercury. After the invert sugar has been critically dehydrated, it is acylated in the presence of acetic anhydride, an acetate of sodium, potassium, ammonium, rubidium, or caesium or an acetate of ethyl or some other alkyl group, and a salt, preferably a chloride, of a metal of the second group of the periodic system. The reaction is conducted within special temperature ranges below a critical temperature. When the reaction is complete, the mixture of acetates is poured into a tank containing about a liter of water kept at room temperature and provided with a stirrer. An amorphous precipitate is formed which is washed until free of acid. The acetates may be recolorized by dissolving in acetone, ethyl alcohol, carbon tetrachloride and chloroform, etc. and cooling or heating with virgin carbon and filtered. If it is desired to produce levulose the mixture of acetates is separated by pouring into water at the temperature at which the one of the lowest melting is fluid and either centrifuging or filtering.

For the purpose of giving those skilled in the art a better understanding of the invention the following illustrative example will be given.

*Example*

About 310 grams of invert sugar syrup is heated in a vacuum at about 70° C. until the refractometer reading shows not less than 88° Brix, about 12% water. The partially dried syrup is then placed in a reaction vessel containing about 1133 grams of acetic anhydride and sodium acetate to an extent of not less than 0.4 of the weight of the sugar (e. g. 150 grams of sodium acetate) and about 80 grams of zinc chloride. The chamber is then heated to about 90° C. for one half hour. The entire reaction mass is then drawn into a tank of water of about one liter volume equipped with a stirrer and at room temperature. An amorphous precipitate of dextrose and fructose penta-acetates is formed immediately. The wash water is drawn off and a fresh supply added. The acetates may be decolorized by dissolving in acetone and cooling to crystallize or by heating with 1% virgin carbon (by weight) and filtered.

When levulose is to be recovered as such, the reaction mass is poured into water at about 100° C. which causes the levulose penta-acetate to melt, leaving a solid dextrose penta-acetate (containing a small amount of fructose penta-acetate) which may be removed by filtering or centrifuging. On the other hand, the reaction mass may be poured on a sieve and boiling water poured over the esters whereby the levulose penta-acetate melts and passes through the sieve and is recovered. The levulose penta-acetate when hydrolized gives levulose which may be recovered by any well known method.

The acetates so produced may be dried and added to sucrose octa-acetate to give solid solutions of desirable characteristics as shown below:

|      | S. O. A.   | D. P. A.   | I. A.  | Solid solution |
|------|------------|------------|--------|----------------|
| M. P. | 70° C     | 112° C     | 65° C  |                |
| S     | 0.09       | 0.12       | 0.10   | 0.10.          |
|      | 1 part     | 9 parts    | ------ | 71° C. M. P.   |
|      | 2 parts    | 8 parts    | ------ | 57° C. M. P.   |
|      | 3.6 parts  | 6.4 parts  | ------ | 52° C. M. P.   |
|      | 6.0 parts  | 4.0 parts  | ------ | 72° C. M. P.   |
|      | 8.0 parts  | 2.0 parts  | ------ | 105° C. M. P.  |

*Legend*

M. P.: Melting point.
S. O. A.: Sucrose octa-acetate.
D. P. A.: Dextrose penta-acetate.
I. A.: Invert sugar acetate (penta).
S: Solubility per 100 grams water at 20° C.

Acetates of invert sugar may be used in place of dextrose penta-acetate with sucrose octa-acetate to produce solid solutions with valuable properties.

We claim:

1. As a new article of manufacture, an adhesive comprising a solid solution of sucrose octa-acetate and invert sugar penta-acetates obtained by mixing between 20 and 80 parts of sucrose octa-acetate with between 80 and 20 parts of invert sugar penta-acetates.

2. As a new article of manufacture, an adhesive comprising a solid solution comprising a mixture of between 20 and 80 parts of sucrose octa-acetate and between 80 and 20 parts of dextrose penta-acetate.

3. As a new article of manufacture, an adhesive comprising a solid solution comprising a mixture of between 20 and 80 parts of sucrose octa-acetate and between 80 and 20 parts of invert sugar acetate.

4. As a new article of manufacture, a solid solution of sucrose octa-acetate and invert sugar penta acetates comprising a mixture containing about 20 to 80 parts by weight of sucrose octa-acetate and about 80 to about 20 parts by weight of invert sugar penta acetates.

5. As a new article of manufacture, a solid solution consisting of sucrose octa-acetate and dextrose penta acetate containing about 20 to about 80 parts by weight of sucrose octa-acetate and about 80 to about 20 parts by weight of dextrose penta acetate, said solid solution having a melting point between about 57° C. and about 105° C.

VICTOR WALTHAUSEN.
LYLLA R. METRY.